US010077077B1

(12) United States Patent
Legray et al.

(10) Patent No.: US 10,077,077 B1
(45) Date of Patent: Sep. 18, 2018

(54) VEHICLE FRONT STRUCTURE WITH SPLAYED VARIABLE GAGE RAIL TIP

(71) Applicants: James V Legray, Lake Orion, MI (US); Bryan G Mrozinski, Saginaw, MI (US); Adrian J Purvis, Rochester Hills, MI (US); Scott E Zilincik, Troy, MI (US)

(72) Inventors: James V Legray, Lake Orion, MI (US); Bryan G Mrozinski, Saginaw, MI (US); Adrian J Purvis, Rochester Hills, MI (US); Scott E Zilincik, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/461,730

(22) Filed: Mar. 17, 2017

(51) Int. Cl.
  *B62D 25/08* (2006.01)
  *B62D 21/15* (2006.01)
  *B62D 21/02* (2006.01)
  *B62D 27/02* (2006.01)

(52) U.S. Cl.
  CPC ........... *B62D 21/152* (2013.01); *B62D 21/02* (2013.01); *B62D 25/08* (2013.01); *B62D 27/02* (2013.01)

(58) Field of Classification Search
  CPC ...... B62D 21/152; B62D 21/02; B62D 25/08; B62D 25/088
  USPC ............ 296/203.01, 203.02, 193.09, 187.09, 296/187.1
  See application file for complete search history.

(56) References Cited

U.S. PATENT DOCUMENTS

| 3,499,661 | A | 3/1970 | Rowe, Jr. |
| 3,840,259 | A | 10/1974 | Barenyi |
| 5,118,160 | A | 6/1992 | Kitagawa et al. |
| 5,533,780 | A | 7/1996 | Larson et al. |
| 5,685,599 | A | 11/1997 | Kitagawa |
| 6,406,088 | B1* | 6/2002 | Tate ..................... B62D 21/152 188/371 |
| 6,460,889 | B2 | 10/2002 | Lyanagi et al. |
| 6,588,830 | B1 | 7/2003 | Schmidt et al. |

(Continued)

FOREIGN PATENT DOCUMENTS

| CN | 103600773 A | 2/2014 |
| EP | 1177968 A2 | 6/2002 |
| WO | 2013017758 A1 | 7/2013 |

OTHER PUBLICATIONS

John Huetter, "2017 Cadillac XT5 278 pounds lighter than SRX through higher-strength steels", Repairer Driven News, Dec. 26, 2016, available at http://www.repairerdrivennews.com/2016/12/26/2017cadillacxt5/.

*Primary Examiner* — Dennis H Pedder
(74) *Attorney, Agent, or Firm* — Ralph E. Smith

(57) ABSTRACT

A vehicle front structure includes side rails, rail tips, and a tension member. The side rails extend longitudinally in a front portion of the vehicle on left and right sides of a central longitudinal axis of the vehicle. The rail tips have a plurality of flat walls that define a hollow polygonal body disposed about a tip axis. The rail tips have proximal and distal ends. The proximal end is fixedly coupled to a forward terminal end of the side rail inboard of an outer quarter of a total vehicle width. The rail tip extends outboard and forward such that the distal end is disposed within the outer quarter. The flat walls have a forward wall thickness that is less than a rearward wall thickness. The tension member is fixedly coupled to the distal ends and spans laterally therebetween.

13 Claims, 7 Drawing Sheets

(56) References Cited

U.S. PATENT DOCUMENTS

| | | |
|---|---|---|
| 6,655,728 B2 | 12/2003 | Sano et al. |
| 6,761,242 B2 | 7/2004 | Yoshida et al. |
| 6,811,211 B2 | 11/2004 | Saito |
| 6,866,115 B2 | 3/2005 | Miyasaka |
| 6,899,195 B2 | 5/2005 | Miyasaka |
| 6,938,948 B1 | 9/2005 | Cornell et al. |
| 6,957,846 B2 | 10/2005 | Saeki |
| 7,407,192 B2 | 8/2008 | Yoshimura |
| 7,641,236 B2 | 1/2010 | Yasuhara et al. |
| 7,699,346 B2 | 4/2010 | Wehner et al. |
| 7,819,218 B2 | 10/2010 | Eichberger et al. |
| 7,850,228 B2 | 12/2010 | Asai |
| 8,118,349 B2 * | 2/2012 | Kihara ................ B62D 25/082 296/187.09 |
| 8,276,955 B2 | 10/2012 | Baccouche et al. |
| 8,596,711 B2 | 12/2013 | Yasui et al. |
| 8,684,451 B1 | 4/2014 | Park et al. |
| 8,764,096 B2 | 7/2014 | Han et al. |
| 9,004,576 B2 | 4/2015 | Sakakibara et al. |
| 9,308,940 B1 | 4/2016 | Malavalli et al. |
| 2008/0007088 A1 | 1/2008 | Newport |
| 2008/0224502 A1 | 9/2008 | Miki |
| 2011/0015902 A1 | 1/2011 | Cheng et al. |
| 2015/0020388 A1 * | 1/2015 | Moss .................... B62D 27/00 29/897.2 |
| 2016/0052557 A1 * | 2/2016 | Tyan .................... B62D 21/152 296/187.01 |

* cited by examiner

US 10,077,077 B1

VEHICLE FRONT STRUCTURE WITH SPLAYED VARIABLE GAGE RAIL TIP

FIELD

The present disclosure relates to a vehicle having a front structure with a splayed variable gage rail tip.

BACKGROUND

This section provides background information related to the present disclosure which is not necessarily prior art.

Vehicles conventionally have an internal body structure including a pair of rails extending longitudinally along the front of the vehicle and on opposite sides of the vehicle's power plant (e.g. engine). A bumper typically extends along the front of the vehicle, between the two rails. The rails typically support the power plant and any number of vehicle components or body panels. The bumper and rails are conventionally designed to absorb some of the forces that can occur during an impact event by deforming. The degree and location of such deformation can determine the trajectory of the vehicle during and after the impact event, and can influence the forces experienced by vehicle occupants. One type of impact event is known as a narrow offset impact (i.e., the IIHS small overlap crash test) where only the outer 25% of the vehicle's width is impacted by a rigid object (e.g., a barrier, wall, or vehicle) during the impact event. Another type of impact event is known as a flat frontal impact where the entire front of the vehicle impacts a flat, rigid object (e.g., a barrier, wall, or vehicle) during the impact event. Yet another type of impact event is known as a frontal oblique impact event where a movable, deformable object (e.g., a movable deformable barrier, or a vehicle) impacts the front corner of the vehicle at an angle relative to the vehicle.

SUMMARY

This section provides a general summary of the disclosure, and is not a comprehensive disclosure of its full scope or all of its features.

In accordance with an aspect of the present disclosure, a vehicle having a front structure including a left side rail, a left rail tip, a right side rail, a right rail tip, and a tension member. The left side rail extends longitudinally in a front portion of the vehicle on a left side of a central longitudinal axis of the vehicle. The left rail tip has a plurality of flat walls that define a hollow polygonal body disposed about a left tip axis. The left rail tip has a proximal end and a distal end. The proximal end of the left rail tip is fixedly coupled to a forward terminal end of the left side rail. The proximal end of the left rail tip is disposed inboard of an outer left quarter of a total width of the vehicle. The left rail tip extends outboard and forward from the proximal end to the distal end of the left rail tip. The distal end of the left rail tip is disposed within the outer left quarter of the total width of the vehicle. Each of the flat walls of the left rail tip has a forward wall thickness at the distal end and a rearward wall thickness at the proximal end. The forward wall thickness of the flat walls of the left rail tip is less than the rearward wall thickness of the flat walls of the left rail tip. The right side rail extends longitudinally in the front portion of the vehicle on a right side of the central longitudinal axis of the vehicle. The right rail tip has a plurality of flat walls defining a hollow polygonal body disposed about a right tip axis. The right rail tip has a proximal end and a distal end. The proximal end of the right rail tip is fixedly coupled to a forward terminal end of the right side rail. The proximal end of the right rail tip is disposed inboard of an outer right quarter of the total width of the vehicle. The right rail tip extends outboard and forward from the proximal end to the distal end of the right rail tip. The distal end of the right rail tip is disposed within the outer right quarter of the total width of the vehicle. Each of the flat walls of the right rail tip has a forward wall thickness at the distal end of the right rail tip and a rearward wall thickness at the proximal end of the right rail tip. The forward wall thickness of the flat walls of the right rail tip is less than the rearward wall thickness of the flat walls of the right rail tip. The tension member is fixedly coupled to the distal ends of the left and right rail tips and spans laterally therebetween.

In accordance with an aspect of the present disclosure, each of the flat walls of the left rail tip has an intermediate wall thickness between the forward and rearward wall thicknesses, the intermediate wall thickness of the flat walls of the left rail tip has an overall trend of narrowing from the proximal end to the distal end of the left rail tip. Each of the flat walls of the right rail tip has an intermediate wall thickness between the forward and rearward wall thickness. The intermediate wall thickness of the flat walls of the right rail tip has an overall trend of narrowing from the proximal end to the distal end of the right rail tip.

In accordance with an aspect of the present disclosure, the proximal ends of the left and right rail tips are received in a corresponding one of the forward terminal ends of the left and right side rails.

In accordance with an aspect of the present disclosure, the proximal end of the left rail tip and the forward terminal end of the left side rail have coaxial octagonal cross-sections. The proximal end of the right rail tip and the forward terminal end of the right side rail have coaxial octagonal cross-sections.

In accordance with an aspect of the present disclosure, the hollow polygonal body of the left rail tip has an octagonal cross-section disposed coaxial about the left tip axis. The hollow polygonal body of the right rail tip has an octagonal cross-section disposed coaxial about the right tip axis.

In accordance with an aspect of the present disclosure, the left and right rail tips are devoid of crush beads.

In accordance with an aspect of the present disclosure, the vehicle front structure further includes a left tip plate and a right tip plate. The left tip plate is fixedly attached to the distal end of the left rail tip. The left tip plate is perpendicular to the central longitudinal axis of the vehicle. The right tip plate is fixedly attached to the distal end of the right rail tip. The right tip plate is perpendicular to the central longitudinal axis of the vehicle.

In accordance with an aspect of the present disclosure, the left tip plate has a planar rear facing surface that abuts the distal end of the left rail tip at a front plane that is perpendicular to the central longitudinal axis of the vehicle. The right tip plate has a planar rear facing surface that abuts the distal end of the right rail tip at the front plane.

In accordance with an aspect of the present disclosure, the vehicle front structure further includes a bracket fixedly mounted to at least one of the flat walls of the left rail tip.

In accordance with an aspect of the present disclosure, the at least one of the flat walls of the left rail tip has a localized wall thickness where the bracket is mounted. The localized wall thickness is thinner than an adjacent wall thickness of the at least one of the flat walls, the adjacent wall thickness being immediately forward of the localized wall thickness.

In accordance with an aspect of the present disclosure, the flat walls of the left rail tip have a constant thickness taken about a cross-section perpendicular to the left tip axis. The flat walls of the right rail tip have a constant thickness taken about a cross-section perpendicular to the right tip axis.

In accordance with an aspect of the present disclosure, the left tip axis forms an angle with the central longitudinal axis that is between 19°-25°. The right tip axis forms an angle with the central longitudinal axis that is between 19°-25°.

In accordance with an aspect of the present disclosure, the left and right tip axes are parallel to a level ground surface when the vehicle is positioned for operation on the level ground surface.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Corresponding reference numerals indicate corresponding parts throughout the several views of the drawings.

DETAILED DESCRIPTION

The following description of the preferred embodiment(s) is merely exemplary in nature and is in no way intended to limit the invention, its application, or uses.

The present disclosure relates to a vehicle having a front structure with a splayed, variable gage rail tip. This vehicle front structure permits dual-mode impact energy absorption at the front of the vehicle without the need for added parts such as reinforcements or blockers. The vehicle front structure allows for progressive, generally straight axial crush of the rail tip during small offset impacts, while also allowing progressive, shifting axial crush of the rail tip during flat barrier impacts. While illustrated and described with reference to the left side of the vehicle, it is understood that the vehicle is constructed to be substantially symmetric with regards to the right and left sides of the front structure of the present disclosure.

Figure 1:
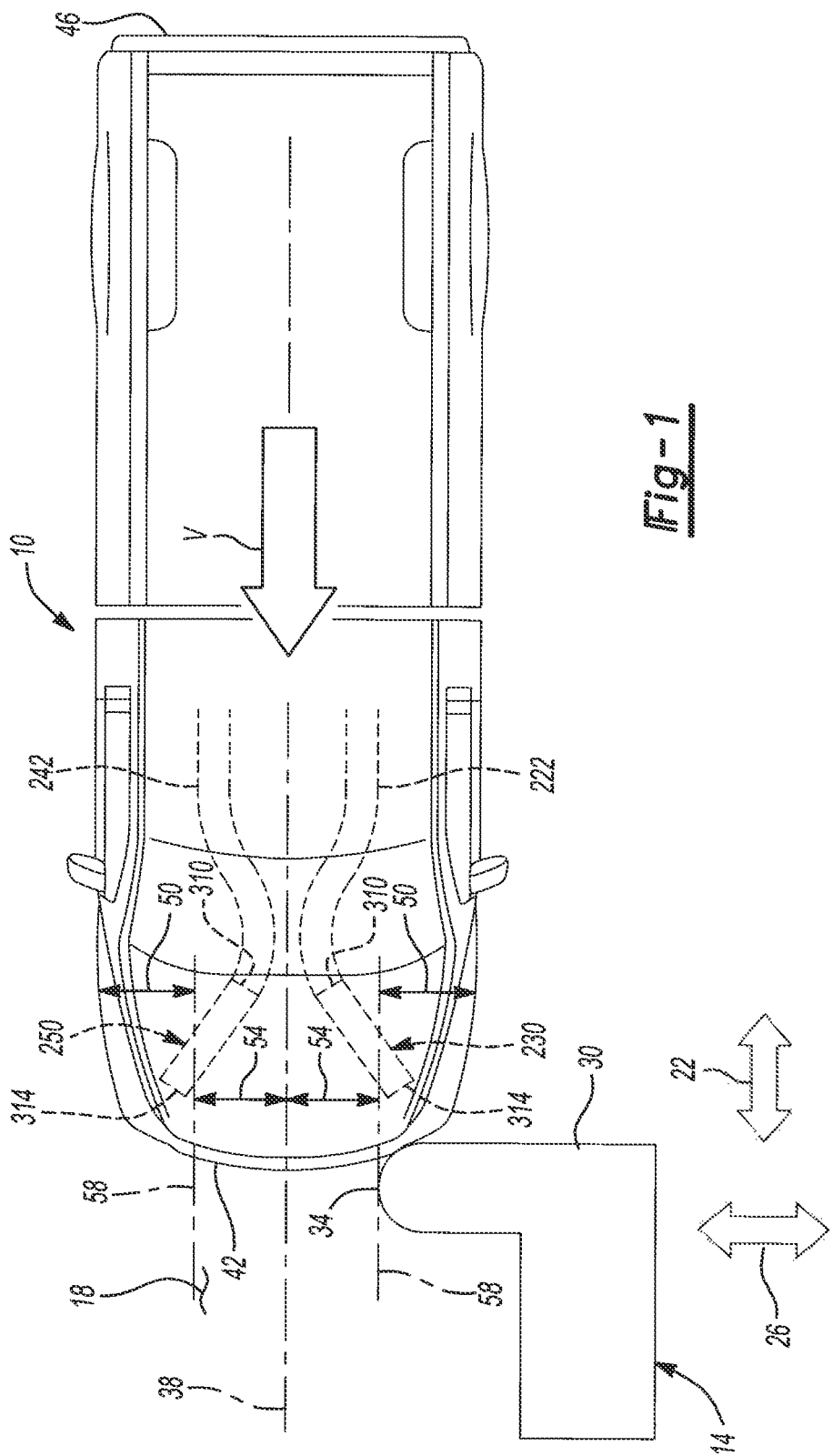
FIG. 1 is a top elevated view of an example of a vehicle and an impact body in accordance with the present disclosure.

With reference to FIG. 1, an example vehicle 10 is illustrated with an impact body, i.e., a barrier 14, positioned in accordance with the Insurance Institute for Highway Safety ("IIHS") small overlap front impact testing. The barrier 14 is a rigid barrier such that the barrier 14 is fixed to the ground 18 to prevent movement of the barrier 14 in a longitudinal direction 22 or a lateral direction 26. The barrier 14 has an impacting face 30 and a generally rounded end 34. The vehicle 10 has a velocity V in the longitudinal direction 22 toward the barrier 14. In the example provided, the vehicle 10 has no velocity in the lateral direction 26 and the vehicle's 10 velocity V is perpendicular to the impact surface 30. In the example provided, the velocity V is 40 mph, though other speeds can be used. The vehicle 10 has a central axis 38 running longitudinally through the vehicle 10 from a front 42 to a rear 46 of the vehicle 10 and bisecting the vehicle 10. The barrier 14 is positioned to impact the vehicle 10 in an outer quarter 50, i.e., outer 25%, of the vehicle's 10 total lateral width. In the example provided, the outer quarter 50 is delineated from an inner quarter 54 by an offset axis 58 that is offset from the central axis 38 by 25% of the total lateral width of the vehicle 10. In other words, the vehicle 10 and barrier 14 are positioned such that when the vehicle 10 impacts the barrier 14, the end 34 generally aligns with the offset axis 58.

Figure 2:
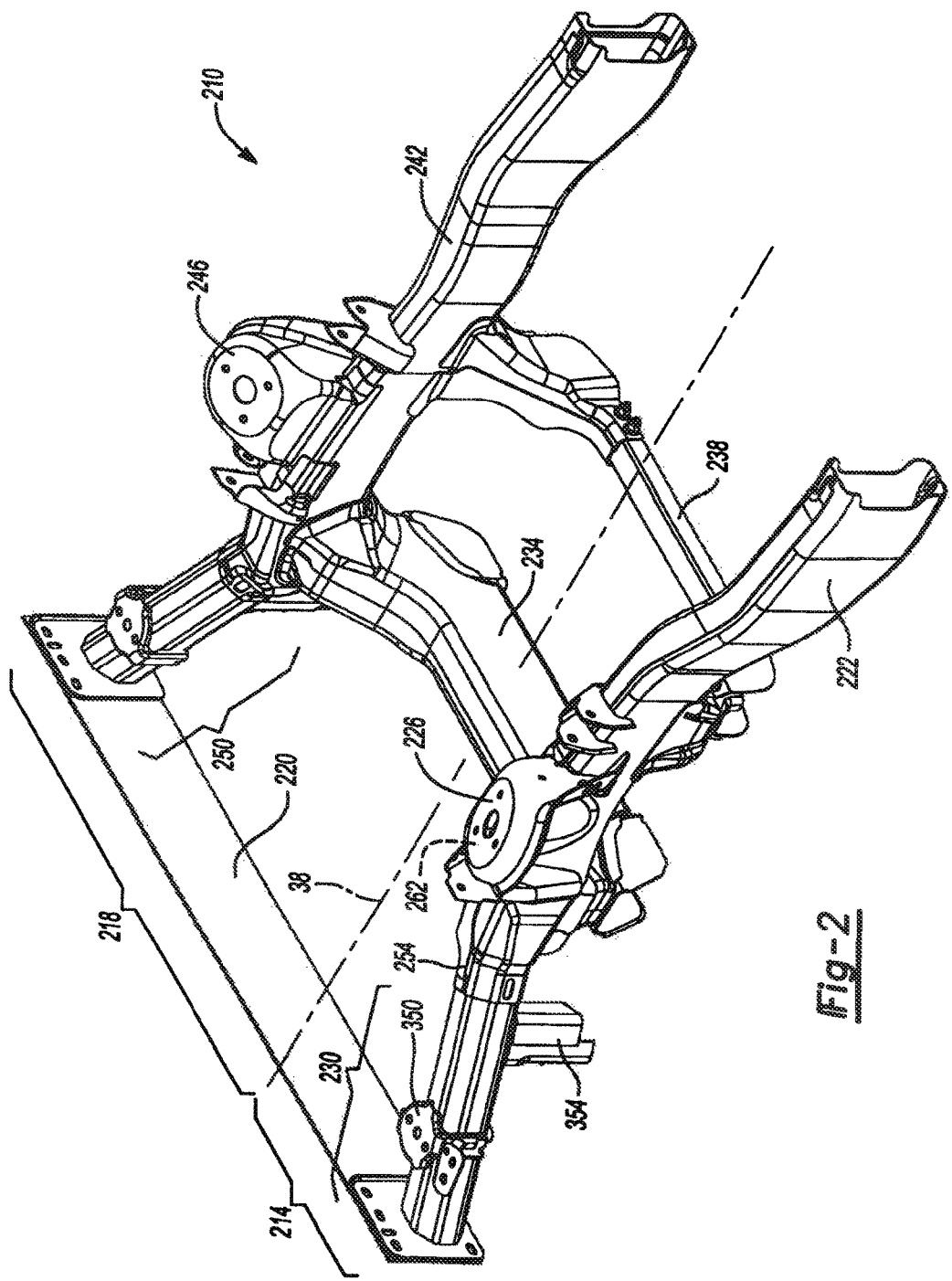
FIG. 2 is a perspective view of a front structure of the vehicle of FIG. 1.

With additional reference to FIG. 2, a front structure 210 of the vehicle 10 is shown. The front structure 210 of the vehicle 10 includes a front left portion 214, a front right portion 218, delineated by the central axis 38, and a tension member 220. The front left portion 214 and the front right portion 218 are similarly constructed and are generally symmetrical about the central axis 38. The front left portion 214 includes a left side rail 222, a left suspension mount 226, a left rail tip 230, and a left half of the tension member 220. In the example provided, the front left portion 214 also includes a left half of a forward lateral rail 234 and a left half of a rearward lateral rail 238. Similarly, the front right portion 218 includes a right side rail 242, a right suspension mount 246, a right rail tip 250, and a right half of the tension member 220. In the example provided, the front right portion 214 also includes a right half of the forward lateral rail 234 and a right half of the rearward lateral rail 238. The front right portion 218 and associated elements are substantially similar to the front left portion 214 and the similar associated elements, e.g., the left side rail 222, the left suspension mount 226, the left rail tip 230, the left half of the forward lateral rail 234, and the left half of the rearward lateral rail 238. Accordingly, only the front left portion 214 is described herein in detail.

The left side rail 222 has a front terminal end 254, proximate to the front 42 of the vehicle 10, and the left side rail 222 extends in the longitudinal direction 22 from the front terminal end 254 toward the rear 46 of the vehicle 10. The left side rail 222 is laterally outboard of an engine 258 (schematically shown in FIG. 3) of the vehicle 10. The forward lateral rail 234 extends in the lateral direction 26 and is fixedly attached to the left side rail 222 and the right side rail 242 proximate to the front 42 (e.g., proximate to the front terminal end 254) to connect the left side rail 222 to the right side rail 242. In the example provided, the forward lateral rail 234 has a generally "U" shape, with one end of the "U" shape attached to the left side rail 222, the other end of the "U" shape attached to the right side rail 242, and the trough of the "U" shape curving downward toward the ground accommodate the engine 258 (schematically shown in FIG. 3) and/or a transmission (not shown) of the vehicle 10 mounted between the left side rail 222 and the right side rail 242. The rearward lateral rail 238 is rearward of the forward lateral rail 234 and extends in the lateral direction 26 and is fixedly attached to the left side rail 222 and the right side rail 242 to connect the left side rail 222 to the right side rail 242. In the example provided, the rearward lateral rail 238 also has a generally "U" shape, with one end of the "U" shape attached to the left side rail 222, the other end of the "U" shape attached to the right side rail 242, and the trough of the "U" shape curving downward toward the ground accommodate a portion of the engine 258 (schematically shown in FIG. 3) and/or transmission (not shown) of the vehicle 10 mounted between the left side rail 222 and the right side rail 242.

The left suspension mount 226 is fixedly attached to the left side rail 222. In the example provided, the left suspension mount 226 is located axially (i.e., in the longitudinal direction 22) between the forward lateral rail 234 and the rearward lateral rail 238. The left suspension mount 226 extends upward and laterally outboard of the left side rail 222 (i.e., the lateral direction 26 away from the central axis 38). The left suspension mount 226 is configured to be attached to a strut (not shown) of the vehicle 10. In the example provided, the left suspension mount 226 includes a spring cup 262 that is open generally downward such that the spring of the strut is received in the spring cup 262 to support the front structure 210 above the ground 18.

Figure 3:
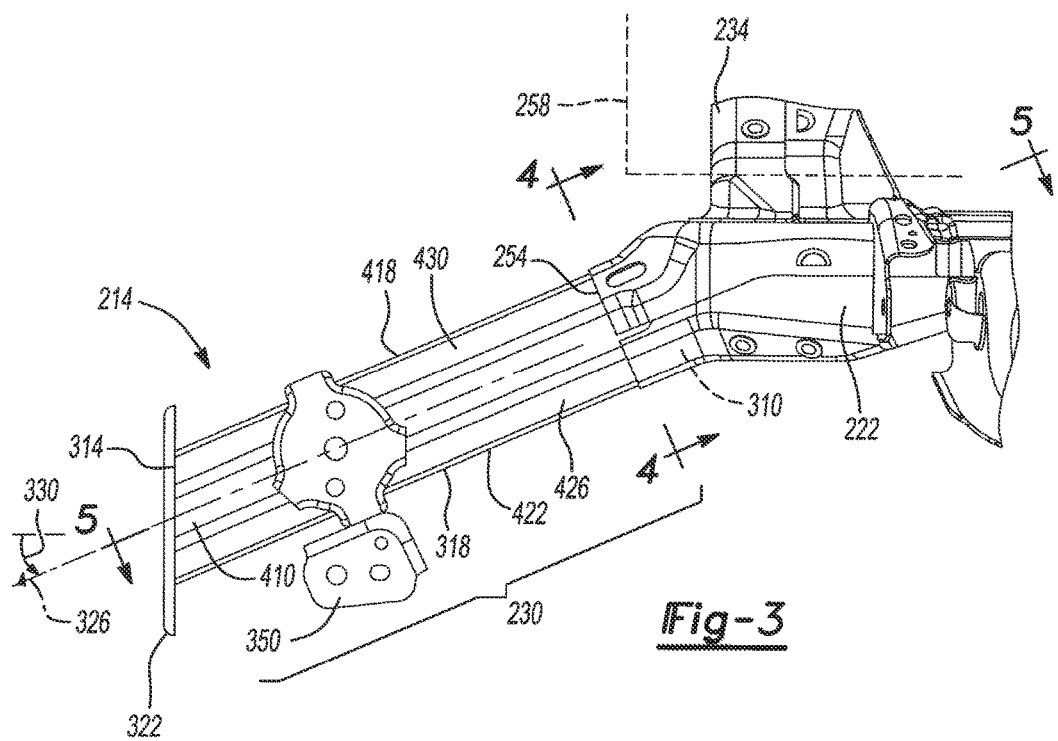
FIG. 3 is a top plan view of a portion of a front left portion of the front structure of FIG. 2, illustrating a rail tip of the front left portion.

With additional reference to FIG. 3, the left rail tip 230 has a proximal end 310, a distal end 314, a crush body 318, and a tip plate 322. The proximal end 310 is fixedly attached to the front terminal end 254 of the left side rail 222. The crush body 318 extends from the front terminal end 254 forward and outboard therefrom to the distal end 314. Thus, the left rail tip 230 extends along a tip axis 326 that forms an angle 330 with the central axis 38 (FIGS. 1 and 2), with the distal end 314 outboard of the proximal end 310. In the example provided, the left rail tip 230, and the tip axis 326 is generally parallel to the ground 18. In the example provided, the angle 330 is between 19°-25°, such as approximately 23° for example, though other angles outside of this range can be used depending on the configuration of the vehicle 10.

The tip plate 322 is fixedly attached (e.g., welded) to the distal end 314. In the example provided, the tip plate 322 is a generally flat plate that is perpendicular to the central axis 38 and the ground 18. The distal end 314 terminates at the tip plate 322 along a plane (e.g., the rearward surface of the tip plate 322) that is perpendicular to the central axis 38.

Figure 6:
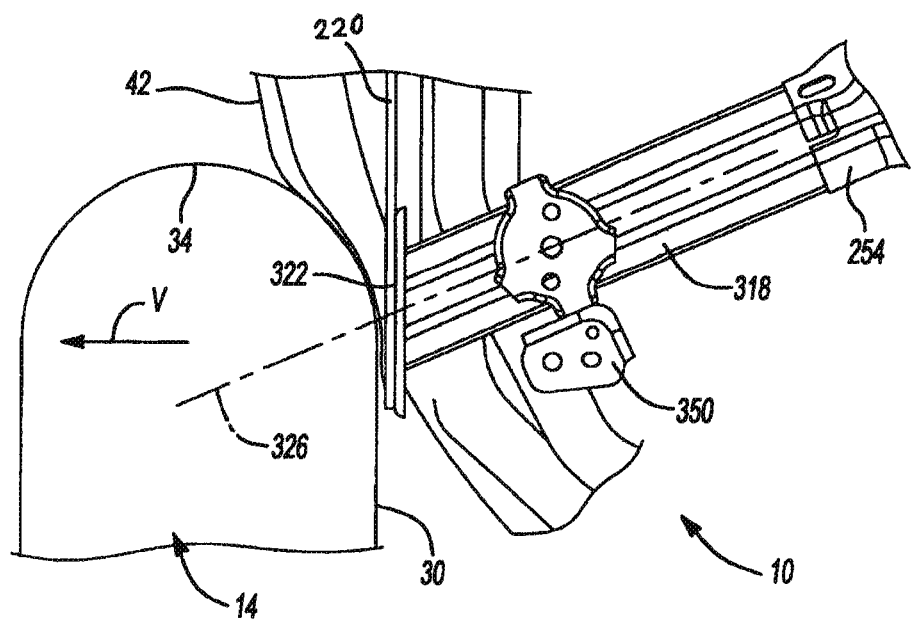
FIG. 6 is a top plan view of the front left portion of FIG. 3, illustrating the impact body of FIG. 1 in a pre-impact position.
Figure 8:
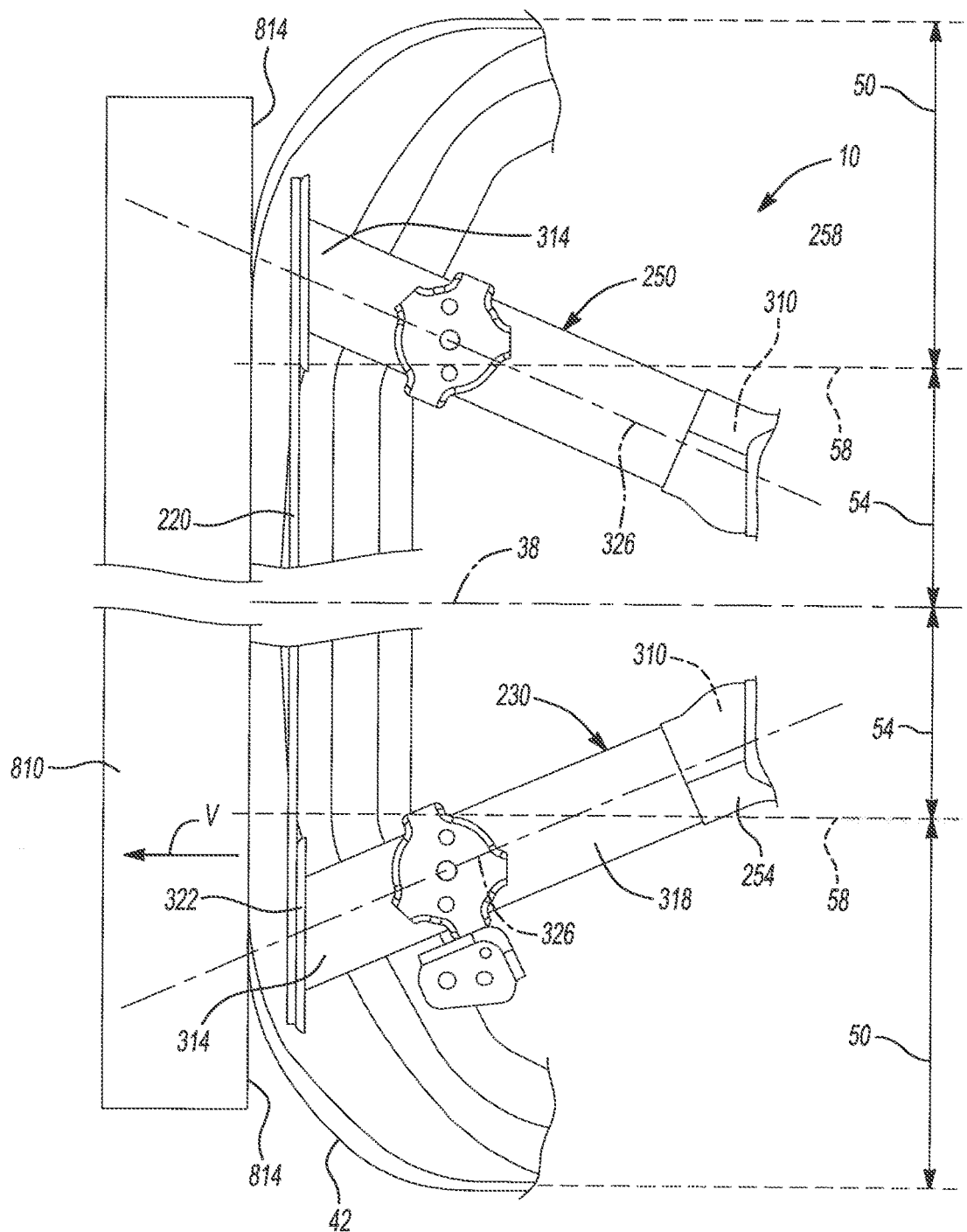
FIG. 8 is a top plan view of a portion of the front structure of FIG. 2, including the front left portion of FIG. 3 and a front right portion, illustrating an impact body of a second construction in a pre-impact position.
Figure 9:
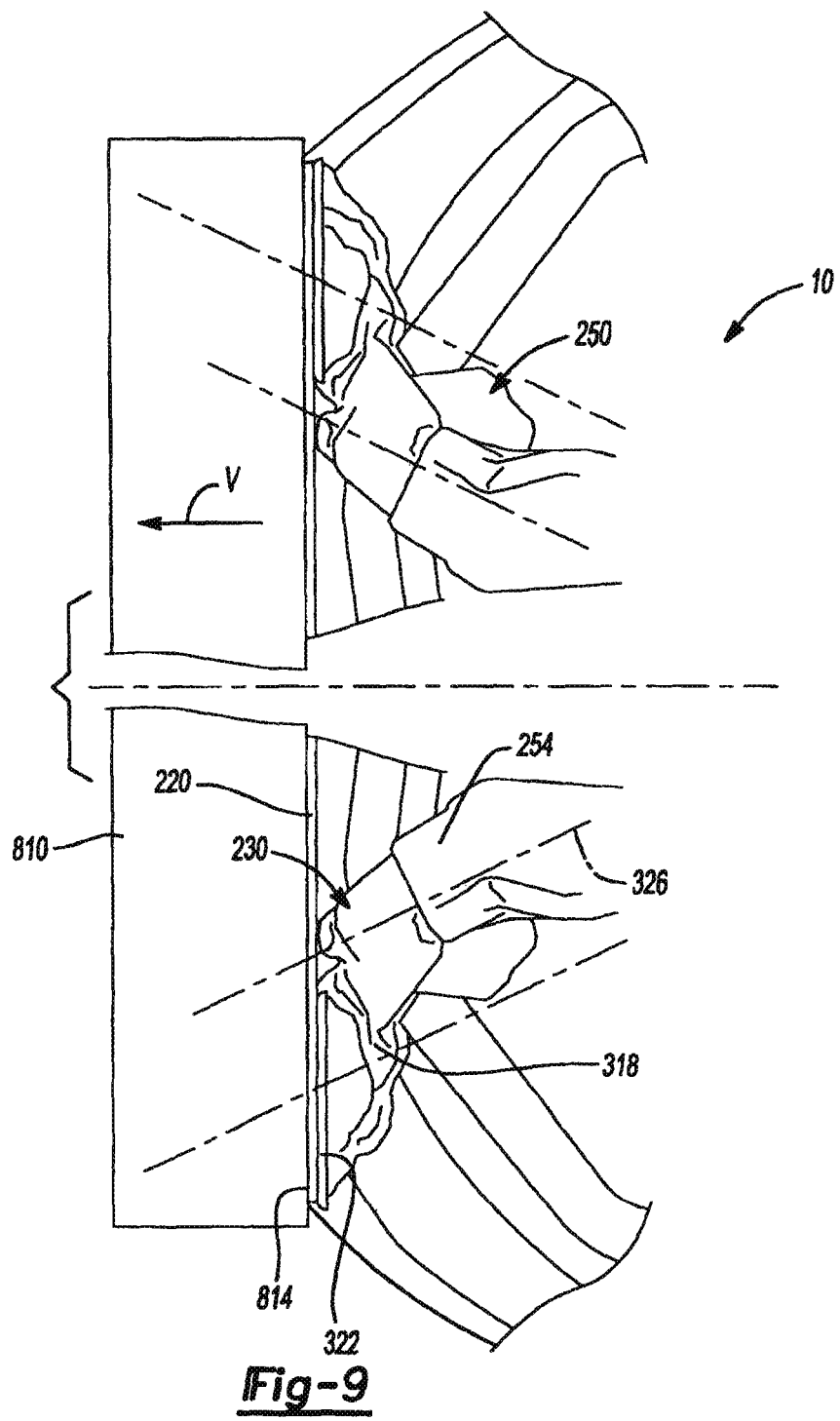
FIG. 9 is a top plan view similar to FIG. 8, illustrating movement of the vehicle relative to the impact body following impact with the impact body.

Returning to FIG. 2, and also shown in FIGS. 6, 8, and 9, the tension member 220 is fixedly attached to the forward surfaces of the tip plates 322 and spans laterally between the two tip plates 322 generally across the front 42 of the vehicle 10. The tension member 220 is a structure that is tensionally rigid in the lateral direction 26 to inhibit relative lateral movement of the distal ends 314 away from each other. While not specifically shown, an energy absorbing member (e.g., a crush can) may be fixedly mounted to the forward side of the tension member 220. In the example provided, the tension member 220 is a thin metal plate that is bolted to the forward surfaces of the tip plates 322. In an alternative construction, the tension member 220 is a cable fixedly attached to the tip plates 322 and spanning laterally between the two tip plates 322 in tension.

Figure 4:
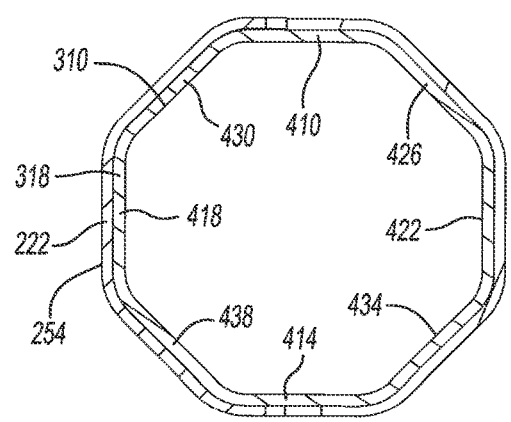
FIG. 4 is a sectional view of the rail tip of FIG. 3, taken along line 4-4 of FIG. 3.

Returning to FIG. 3 and with additional reference to FIG. 4, the front terminal end 254 of the left side rail 222 extends a short length along the tip axis 326. The front terminal end 254 has a hollow, tubular shape, having a polygonal cross-section. In the example provided, the front terminal end 254 has an octagonal cross-section centered about the tip axis 326. The left rail tip 230 has a hollow, tubular shape, having a polygonal cross-section similar to the front terminal end 254. In the example provided, the left rail tip 230 has an octagonal cross-section centered about the tip axis 326. In the example provided, the octagonal cross-section of the left rail tip 230 is slightly smaller than the octagonal cross-section of the front terminal end 254, such that the proximal end 310 fits coaxially within the front terminal end 254. In the example provided, the proximal end 310 is press-fit or slip-fit into the front terminal end 254 and then welded in place such that the proximal end 310 is fixedly attached to the front terminal end 254.

With specific reference to FIG. 4, the octagonal shape of the left rail tip 230 is such that the left rail tip 230 has flat, top and bottom walls 410, 414 that are parallel to the ground 18, a set of flat side walls 418, 422 that are perpendicular to the ground 18, and flat diagonal walls 426, 430, 434, 438 therebetween. Thus, brackets (e.g., bracket 350 or bracket 354 shown in FIGS. 3 and 4), body panels (not specifically shown), or bumper components (not specifically shown) are easily mountable or weldable to the left rail tip 230. In the example provided, the interior and exterior surfaces of the left rail tip 230 are generally smooth and devoid of crush beads or indentions, which are typically used in other front structures (not shown) to provide controlled compression.

Figure 5:
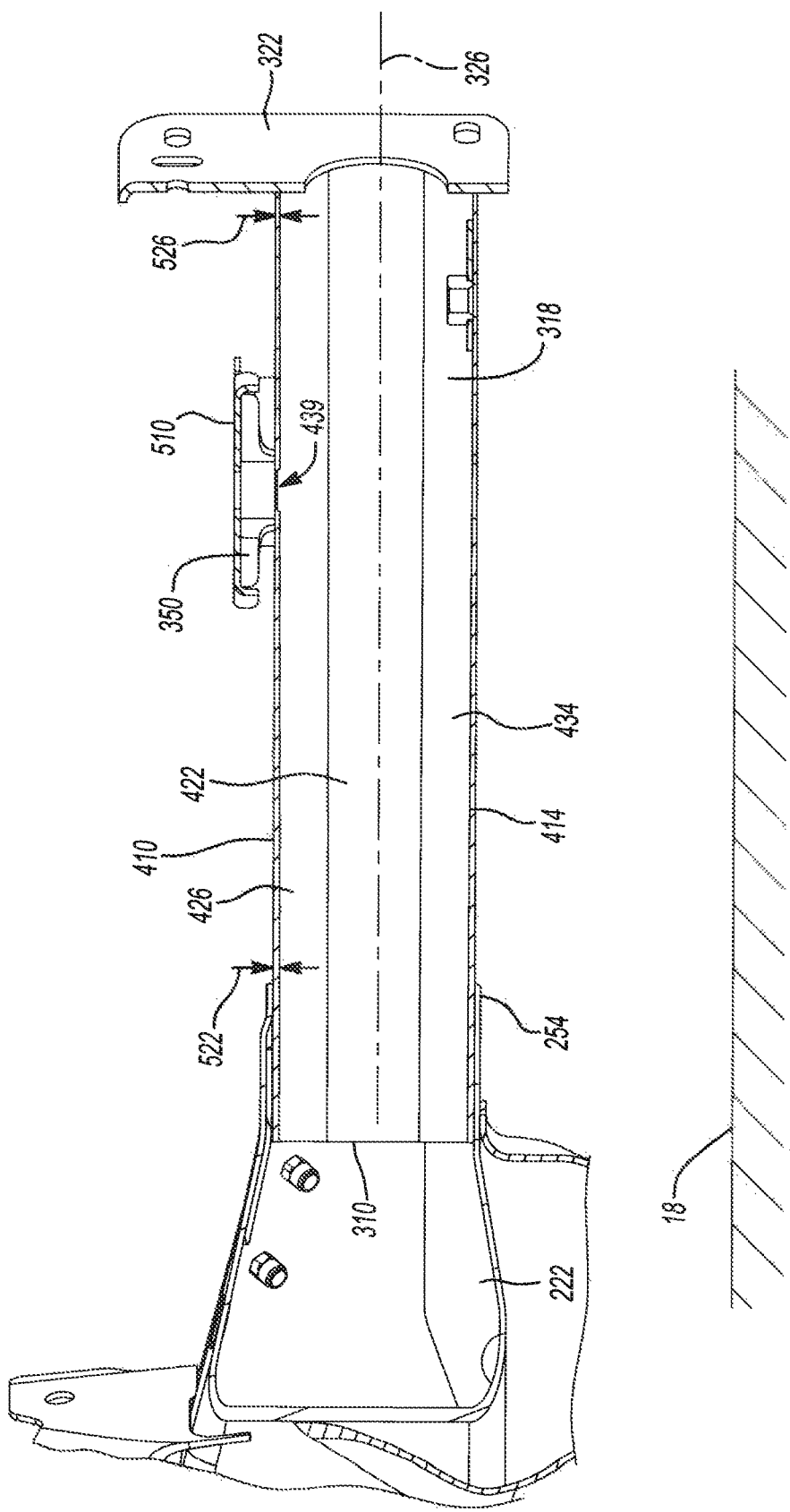
FIG. 5 is a sectional view of the rail tip of FIG. 3, taken along line 5-5 of FIG. 3.

With additional reference to FIG. 5, a cross-sectional view of the left rail tip 230 and the front terminal end 254 is illustrated, taken along the tip axis 326 (i.e., line 5-5 shown in FIG. 3). In the example provided, the bracket 350 includes a mounting plate 510. The mounting plate 510 is fixedly coupled to the top wall 410 and has a top surface that is parallel to the top wall 410. The left rail tip 230 is formed such that the top and bottom walls 410, 414, the side walls 418, 422 and the diagonal walls 426, 430, 434, 438 have a thickness, i.e., gage, that tapers from the proximal end 310 to the distal end 314. In other words, the walls 410, 414, 418, 422, 426, 430, 434, 438 of the left rail tip 230 have a first thickness 522 at the proximal end 310 and a second thickness 526 at the distal end 314 that is thinner than the first thickness 522. The walls 410, 414, 418, 422, 426, 430, 434, 438 have an overall trend of narrowing from the proximal end 310 to the distal end 314. In the example provided, the thickness of the walls 410, 414, 418, 422, 426, 430, 434, 438 narrows smoothly and continuously from the proximal end 310 to the distal end 314 without discreet steps down in the thickness of the walls 410, 414, 418, 422, 426, 430, 434, 438. As best seen in FIG. 4, the walls 410, 414, 418, 422, 426, 430, 434, 438 have a constant thickness at any particular cross-section taken along a line perpendicular to the tip axis 326 (e.g., line 4-4).

In an alternative construction, the walls 410, 414, 418, 422, 426, 430, 434, 438 have lengths where their thickness remains constant, while the overall trend still narrows from the proximal end 310 to the distal end 314. In an alternative construction, the thickness of the walls 410, 414, 418, 422, 426, 430, 434, 438 is thinner at a bracket (e.g., bracket 350, or 354) that is mounted to the walls 410, 414, 418, 422, 426, 430, 434, 438, than the thickness immediately forward of the bracket, but the overall trend of the walls 410, 414, 418, 422, 426, 430, 434, 438 narrowing from the proximal end 310 to the distal end 314 remains. This localized thinning 439 (i.e., area of reduced localized wall thickness) at the bracket compensates for the added structural rigidity provided by the bracket, thus ensuring desired crush properties of the left rail tip 230 are maintained even through the length of the left rail tip 230 that includes the bracket. This localized thinning 439 allows the crush characteristics to be tuned to the specific configuration of the rail tip 230.

With reference to FIG. 1 and additional reference to FIG. 6, the barrier 14 and vehicle 10 are illustrated in a pre-impact condition wherein the barrier 14 is aligned to impact the outer quarter 50 of the left side of the vehicle 10, with the vehicle having a velocity V in the longitudinal direction 22 only, as described above with reference to FIG. 1. The barrier 14 is aligned to impact generally at the tip plate 322 and approximately at the tip axis 326 as the vehicle moves toward the barrier 14 in the longitudinal direction 22.

Figure 7:
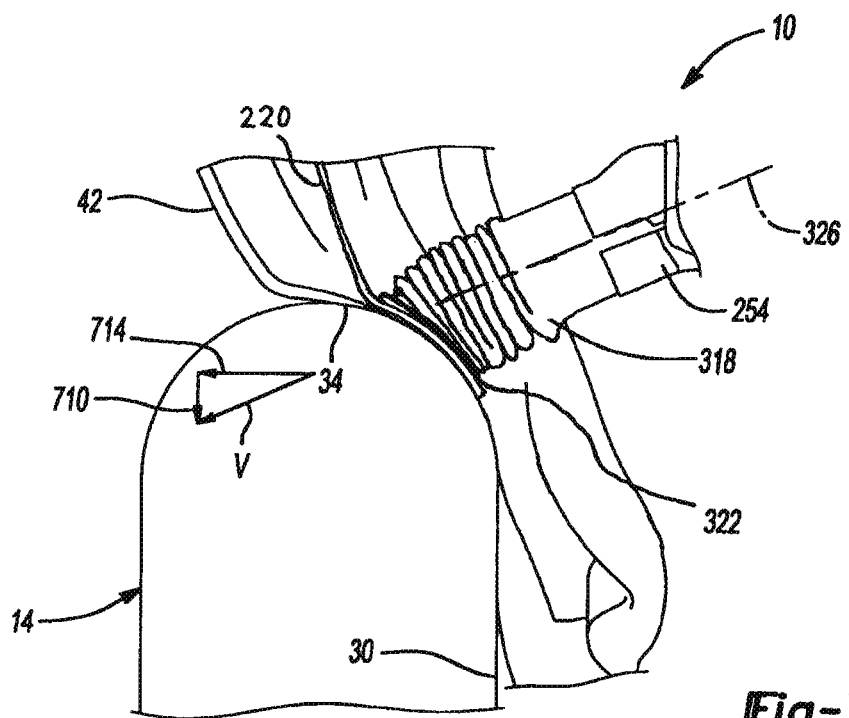
FIG. 7 is a top plan view similar to FIG. 6, illustrating movement of the vehicle relative to the impact body following impact with the impact body.

With additional reference to FIG. 7, the barrier 14 and vehicle 10 are illustrated in an impact condition after a predetermined amount of time after impact. The geometry of the left rail tip 230, including the tapered walls 410, 414, 418, 422, 426, 430, 434, 438 and the angle of the tip axis 326 causes the vehicle 10 to gain a lateral velocity component 710, in addition to the longitudinal velocity component 714, such that the barrier 14 progresses relative to the vehicle 10 laterally toward the central axis 38 generally along the tip axis 326. The left rail tip 230 crushes, i.e., compresses generally along the tip axis 326, absorbing some of the impact forces.

With additional reference to FIG. 8, a flat barrier 810 and the left rail tip 230 and right rail tip 250 are illustrated in a pre-impact condition. The flat barrier 810 has a flat impacting face 814 that is perpendicular to the central axis 38 of the vehicle 10. The flat barrier 810 and flat impacting face 814 extend laterally across the entire front 42 of the vehicle 10.

With additional reference to FIG. 9, the flat barrier 810 and vehicle 10 are illustrated in an impact condition after a predetermined amount of time after impact. The geometry of the left rail tip 230, including the tapered walls 410, 414, 418, 422, 426, 430, 434, 438 and the angle of the tip axis 326, along with the tension member 220 causes the left rail tip 230 to crush in a step-wise manner, absorbing some of the impact forces and minimizing material stack-up of the left rail tip 230. The right rail tip 250 is similarly constructed and also crushes in a step-wise manner, absorbing some of the impact forces and minimizing material stack-up of the right rail tip 250, similar to the left rail tip 230. The tension member 220 ties the left and right rail tips 230, 250 together in the lateral direction 26 to resist bending moments of the left and right rail tips 230, 250 during full, flat frontal impact events.

Accordingly, the front structure 210 interacts with all front impact events without prematurely buckling and while providing progressive axial crush during small overlap and oblique impacts while minimizing material stack-up of fully crushed parts during full, flat frontal impacts. Furthermore, by minimizing material stack-up, the front structure 210 has the further added benefit of permitting the vehicle 10 to have an overall smaller front end.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. A vehicle front structure comprising:
a left side rail extending longitudinally in a front portion of the vehicle on a left side of a central longitudinal axis of the vehicle;
a left rail tip having a plurality of flat walls defining a hollow polygonal body disposed about a left tip axis, the left rail tip having a proximal end and a distal end, the proximal end of the left rail tip being fixedly coupled to a forward terminal end of the left side rail, the proximal end of the left rail tip being disposed inboard of an outer left quarter of a total width of the vehicle, the left rail tip extending outboard and forward from the proximal end to the distal end of the left rail tip, the distal end of the left rail tip being disposed within the outer left quarter of the total width of the vehicle, each of the flat walls of the left rail tip having a forward wall thickness at the distal end of the left rail tip and a rearward wall thickness at the proximal end of the left rail tip, the forward wall thickness of the flat walls of the left rail tip being less than the rearward wall thickness of the flat walls of the left rail tip;
a right side rail extending longitudinally in the front portion of the vehicle on a right side of the central longitudinal axis of the vehicle;
a right rail tip having a plurality of flat walls defining a hollow polygonal body disposed about a right tip axis, the right rail tip having a proximal end and a distal end, the proximal end of the right rail tip being fixedly coupled to a forward terminal end of the right side rail, the proximal end of the right rail tip being disposed inboard of an outer right quarter of the total width of the vehicle, the right rail tip extending outboard and forward from the proximal end to the distal end of the right rail tip, the distal end of the right rail tip being disposed within the outer right quarter of the total width of the vehicle, each of the flat walls of the right rail tip having a forward wall thickness at the distal end of the right rail tip and a rearward wall thickness at the proximal end of the right rail tip, the forward wall thickness of the flat walls of the right rail tip being less than the rearward wall thickness of the flat walls of the right rail tip; and
a tension member fixedly coupled to the distal ends of the left and right rail tips and spanning laterally therebetween.

2. The vehicle front structure of claim 1, wherein each of the flat walls of the left rail tip has a wall thickness that gradually tapers from the proximal end to the distal end of the left rail tip, wherein each of the flat walls of the right rail tip has a wall thickness that gradually tapers from the proximal end to the distal end of the right rail tip.

3. The vehicle front structure of claim 1, wherein the proximal ends of the left and right rail tips are received in a corresponding one of the forward terminal ends of the left and right side rails.

4. The vehicle front structure of claim 3, wherein the proximal end of the left rail tip and the forward terminal end of the left side rail have coaxial octagonal cross-sections, wherein the proximal end of the right rail tip and the forward terminal end of the right side rail have coaxial octagonal cross-sections.

5. The vehicle front structure of claim 1, wherein the hollow polygonal body of the left rail tip has an octagonal cross-section disposed coaxial about the left tip axis, wherein the hollow polygonal body of the right rail tip has an octagonal cross-section disposed coaxial about the right tip axis.

6. The vehicle front structure of claim 1, wherein the left rail tip and the right rail tip are devoid of crush beads.

7. The vehicle front structure of claim 1, further comprising a left tip plate and a right tip plate, the left tip plate fixedly attached to the distal end of the left rail tip, the left tip plate being perpendicular to the central longitudinal axis of the vehicle, the right tip plate fixedly attached to the distal end of the right rail tip, the right tip plate being perpendicular to the central longitudinal axis of the vehicle.

8. The vehicle front structure of claim 7, wherein the left tip plate has a planar rear facing surface that abuts the distal end of the left rail tip at a plane that is perpendicular to the central longitudinal axis of the vehicle, wherein the right tip plate has a planar rear facing surface that abuts the distal end of the right rail tip at the front plane.

9. The vehicle front structure of claim 1, further comprising a bracket fixedly mounted to at least one of the flat walls of the left rail tip.

10. The vehicle front structure of claim 9, wherein the at least one of the flat walls of the left rail tip has a localized wall thickness where the bracket is mounted, the localized wall thickness being thinner than an adjacent wall thickness of the at least one of the flat walls, the adjacent wall thickness being immediately forward of the localized wall thickness.

11. The vehicle front structure of claim 1, wherein the flat walls of the left rail tip have a constant thickness taken about a cross-section perpendicular to the left tip axis, wherein the flat walls of the right rail tip have a constant thickness taken about a cross-section perpendicular to the right tip axis.

12. The vehicle front structure of claim 1, wherein the left tip axis forms an angle with the central longitudinal axis that is between 19°-25°, wherein the right tip axis forms an angle with the central longitudinal axis that is between 19°-25°.

13. The vehicle front structure of claim 1, wherein the left and right tip axes are parallel to a level ground surface when the vehicle is positioned for operation on the level ground surface.

* * * * *